INVENTOR.
Maurice W. Long

Oct. 24, 1967            M. W. LONG            3,349,327

MICROWAVE POWER METER

Filed Jan. 7, 1964            2 Sheets-Sheet 2

INVENTOR.
Maurice W. Long

BY

ATTORNEYS

United States Patent Office 3,349,327
Patented Oct. 24, 1967

3,349,327
MICROWAVE POWER METER
Maurice W. Long, Atlanta, Ga., assignor to Georgia Tech Research Institute, Atlanta, Ga., a corporation of Georgia
Filed Jan. 7, 1964, Ser. No. 336,189
11 Claims. (Cl. 324—95)

ABSTRACT OF THE DISCLOSURE

What is disclosed herein is a power meter for measuring electro-magnetic power in the millimeter and low millimeter region which includes an incoherent power source having electromagnetic power at a plurality of frequencies over a wide range of frequencies, a wave guide trombone with the mechanical length of one path variable at a constant rate relative to another path so as to modulate electromagnetic power from the incoherent power source at a plurality of Doppler frequencies in the audio frequency range, a detector for demodulating the modulated power output of the wave guide trombone to provide a voltage envelope with a voltage component corresponding to each Doppler frequency, a continuously tunable audio frequency amplifier for amplifying those voltage components within the voltage envelope having frequencies within a selective range of audio frequencies to provide a signal output to an indicating means, and switch means for substituting an unknown electromagnetic power for the incoherent power source as the power input to the wave guide trombone.

---

This invention relates to a system for determining electromagnetic power in a plurality of frequency intervals for measurement and other purposes and more particularly to a microwave power meter suitable for measuring electromagnetic power having a wavelength in the millimeter and low millimeter region.

The measuring of microwave power is essential to meeting requirements such as the determining of the microwave power of a coherent source, the insertion loss caused by a circuit component in an electronic system operated at wavelengths in the millimeter or low millimeter region, or the sensitivity of a circuit component such as a detector used at wavelengths in the millimeter or low millimeter region. However, the accurate and convenient measuring of electromagnetic power is difficult where the wavelength of the electromagnetic power is in the millimeter or low millimeter region.

This is because in the millimeter and low millimeter region electromagnetic power can be conducted only in wave guides or similar arrangements. Thus, conventional power meters based upon a current-impedance relationship are wholly unsuited since current and impedance cannot be directly measured.

Previous efforts to provide a microwave power meter suitable for use with electromagnetic power in the millimeter and low millimeter region have been largely unsuccessful. Most of these previous efforts have used a barretter or thermistor detector and have based the measurement of microwave power upon the substitution of direct current power or audio frequency power for the microwave power. These power meters have an inherent calibration error caused by uncertainty as to the ratio of substituted power in the detector to microwave power incident upon the detector. Thus, in these power meters there is an unknown factor which in general depends upon frequency even within a given frequency interval.

Those previous power meters which attempted to avoid such an unknown factor by using coherent sources as local oscillators in superheterodyne systems have been limited in usefulness by the fact that coherent power sources are available for only limited frequency ranges and are not readily available for many frequency ranges. Thus, such power meters have failed to provide a microwave power meter for use in much of the millimeter and low millimeter region and those microwave power meters which have been developed have been limited in usefulness by being suited for use in only a relatively narrow frequency interval.

Previous efforts have been made to provide a microwave power meter which avoids the limitations imposed by unknown factors or by the lack of suitable coherent power sources. These efforts have combined a noise source with a resonant structure or a conventional wave guide. The noise source cooperates with the resonant structure or conventional wave guide to provide a reference power with which power measurements can be accomplished. These previous efforts have not provided a completely satisfactory microwave power meter because the power meters are not tunable and because the resonant structures pass frequencies in a multiplicity of bands and because conventional wave guides pass all frequencies beyond the cut-off frequency of the wave guide.

The microwave power meter disclosed herein overcomes these and other difficulties previously experienced with power meters for making power measurements of electromagnetic energy in the millimeter and low millimeter region. The power meter disclosed herein provides a highly-sensitive microwave power meter suitable for making power measurements throughout the entire millimeter and low millimeter region and which can be used throughout this region for determining the power of relatively weak coherent power sources, the sensitivity of detection components, the insertion loss of circuit components, and for substantially all other power measurements required in the millimeter and low millimeter region. This is because the power meter is continuously tunable to provide a plurality of reference powers throughout a substantial portion of the millimeter and low millimeter region and because the power meter is readily adaptable to providing reference powers throughout the entire millimeter and low millimeter region.

Each reference power is defined by a microwave frequency interval with a center frequency and when the power of a coherent power source within a frequency interval or a plurality of frequency intervals is to be determined, it is simply necessary to tune the power meter to the frequency interval or intervals of interest and to compare the unknown power of the coherent power source with the known reference power of the power meter in the frequency interval or intervals. Similarly, by tuning the power meter to a frequency interval or plurality of frequency intervals and observing the change in reference power in the frequency interval or plurality of frequency intervals when the reference power is fed through a detector or other circuit component of unknown characteristics, the sensitivity or insertion loss of the component in the frequency interval or plurality of frequency intervals is easily determined. From these examples of the use of the power meter disclosed herein, it will be apparent that the power meter has wide application to a variety of electromagnetic measurements.

These improvements in power meters are provided by a power meter comprising an incoherent power source of known power characteristics from which power is fed to a detector through a modulator. The modulator modulates the microwave power from the incoherent power source at audio frequencies by equally dividing and recombining the microwave power between the incoherent power source and the detector so as to create Doppler components. These Doppler components have audio frequencies which are uniquely related to the wavelengths of the microwave power within the modulator. The incoherent power source provides microwave power at substantially all wavelengths throughout a substantial portion of the millimeter and low millimeter region and as a result, the microwave power fed to the detector from the modulator is modulated by Doppler components at a plurality of audio frequencies with each audio frequency being uniquely related to that power of the incoherent power source having a particular wavelength within the modulator.

This input to the detector of microwave power modulated at an audio frequency for each wavelength of the microwave power in the modulator causes a detector voltage output which is fed to an audio frequency amplifier. The voltage output of the detector contains components at each audio frequency in the microwave power fed to the detector. However, the audio amplifier is tuned to amplify only a particular audio frequency interval and only those audio frequency components having frequencies within this audio frequency interval are amplified. Thus, the output of the amplifier is related to only that microwave power from the incoherent power source which is in a microwave frequency interval having wavelengths corresponding to the frequencies within the audio frequency interval.

The power of the incoherent power source in various microwave frequency intervals is known and the result of selecting a particular microwave frequency interval by tuning the audio amplifier to a particular audio frequency interval is to provide an amplifier output representative of a particular microwave power within a particular microwave frequency interval. Moreover, by tuning the audio amplifier to different audio frequency intervals, amplifier outputs representative of microwave powers within different microwave frequency intervals are easily and conveniently obtained without the use of a plurality of difficult to obtain and expensive coherent power sources and without encountering the limitations and difficulties experienced with previous efforts to provide microwave power meters.

These and other features and advantages of the present invention will be more clearly understood from the following detailed description and the accompanying drawings and in which like characters of reference designate corresponding parts in all figures and in which.

Figure 1:
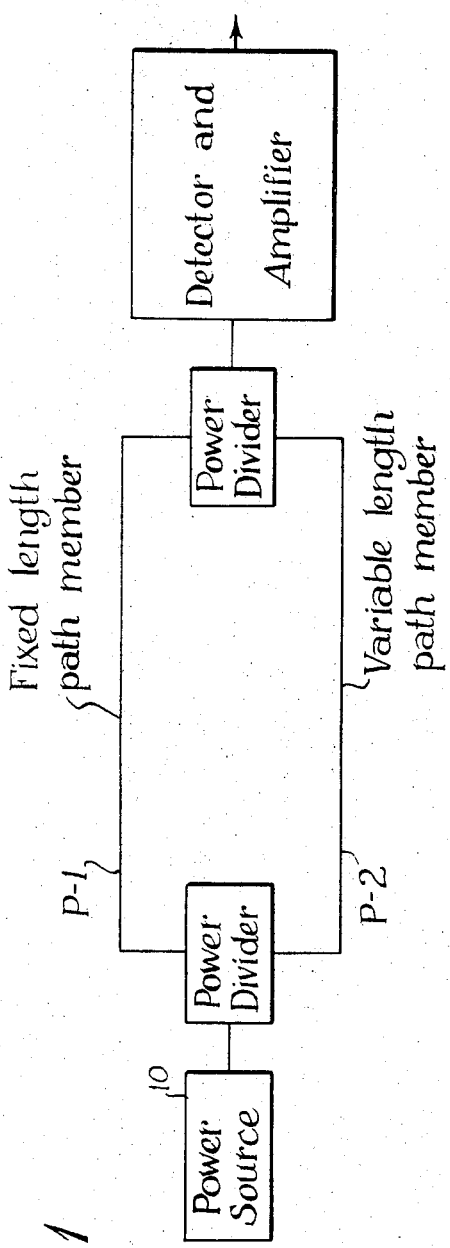
FIG. 1 is a simplified block diagram of the system disclosed herein.

These figures and the following detailed description disclose a specific embodiment of the invention but the invention is not limited to the details disclosed since it may be embodied in other equivalent forms.

The microwave power meter disclosed herein comprises an incoherent power source 10, a detector 11, a modulator 12 for modulating at audio frequencies the microwave power from the incoherent power source 10 between the incoherent power source 10 and the detector 11, and an audio amplifier 13 for amplifying the output of the detector 11. The modulator 12 may be any device for feeding the microwave power from the incoherent power source 10 to the detector 11 by two parallel paths which vary in length with respect to each other.

In the specific embodiment of the invention described herein, the modulator 12 is a wave guide trombone having a first power divider such as an input T member 14, a second power divider such as an output T member 15, a fixed path length member such as a stationary loop member 16, and a variable path length member such as a movable loop member 17. One end of the stationary loop member 16 is joined to the first output arm 18 of the input T member 14 and the other end of the stationary loop member 16 is joined to the first input arm 19 of the output T member 15. One end of the movable loop member 17 is slidably inserted into the second output arm 20 of the input T member 14 and the other end of the movable loop member 17 is slidably inserted into the second input arm 21 of the output T member 15. Support members R are provided for supporting the modulator 12 and means (not shown) is provided for positioning all portions of the power meter with respect to each other.

The input T member 14 is an E-plane T of known type in which the output arms 18 and 20 are half the height of the input arm 22. Similarly, the output T member 15 is an E-plane T of known type in which the input arms 19 and 21 are half the height of the output arm 23. The stationary loop member 16 and the movable loop member 17 are fabricated from wave guide stock of known type and it will be understood that when the microwave power from the incoherent power source 10 is fed to the input arm 22 of the input T member 14, one-half of the microwave power passes along a path P–1 through the stationary loop member 16 and one-half of the microwave power passes along a path P–2 through the movable loop member 17. The microwave power from the incoherent power source 10 is fed to the input arm 22 of the input T member 14 through a wave guide member 24 of known type and after the halves of the microwave power from the paths P–1 and P–2 are recombined in the output T member 15, the microwave power is fed from the output arm 23 of the output T member 15 to the detector 11 by a wave guide member 25 of known type.

Operating means such as a piston 40 hydraulically reciprocated in a cylinder 41 in conventional manner is provided for slidably moving the movable loop member 17 with respect to the stationary loop member 16 in a reciprocating manner. The operating means (not shown) serves to vary the length of the path P–2 at a substantially constant rate between a minimum lenth less than the length of the path P–1 and a maximum length greater than the length of the path P–1. The minimum length and the maximum length of the path P–2 differ from the fixed length of the path P–1 to substantially the same extent and the paths P–1 and P–2 are of the same length each time the movable loop member 17 is moved to vary the length of the path P–2 between its minimum length and its maximum length.

Thus, during each complete cycle of movable loop member 17 motion, the length of the path P–2 is twice equal to the length of the path P–1 and the difference between the length of the path P–1 and the length of the path P–2 twice increases and decreases at a constant rate. One increase and decrease in the difference between the length of the path P–1 and the length of the path P–2 occurs as a result of making the path P–2 shorter than the path P–1 and the other increase and decrease in the difference between the length of the path P–1 and the length of the path P–2 occurs as a result of making the path P–2 longer than the path P–1.

The result of this motion of the movable loop member 17 with respect to the stationary loop member 16 is that the microwave power from the incoherent power source 10 is fed from the incoherent power source 10 to the detector 11 over paths P–1 and P–2 having a difference in length varying at a constant speed $s$ from zero to a maximum. This varying of the difference between the lengths of the paths P–1 and P–2 at a constant speed $s$ produces a Doppler component within the output T member 15 having a frequency $f_a$ related to the wavelength $\lambda_g$ of microwave power in the modulator 12 by the equation:

$$f_a = s/\lambda_g \qquad (1)$$

The Doppler component modulates the microwave power within the output T member 15 at the frequency $f_a$ and it will be understood that if the microwave power from the incoherent power source 10 has a plurality of wavelengths $\lambda_g$ within the modulator 12, the input to the detector 11 from the modulator 12 will be modulated at a plurality of frequencies $f_a$ with each frequency $f_a$ being directly related to a particular wavelength $\lambda_g$ of microwave power within the modulator 12. The substantially constant speed $s$ at which the difference between the lengths of the paths P-1 and P-2 varies is selected so that each frequency $f_a$ related to a wavelength $\lambda_g$ of microwave power in the modulator 12 in the manner indicated by Equation 1 is in the audio frequency range.

The detector 11 to which the microwave power modulated at the frequencies $f_a$ is fed from the modulator 12 is an evacuated barretter of known type and serves in known manner to demodulate the output of the modulator 12 so as to provide an output voltage envelope defined by components at the audio frequencies $f_a$ at which the microwave power in the modulator 12 is modulated by the Doppler components. It is this voltage envelope containing a component at an audio frequency $f_a$ for each wavelength $\lambda_g$ of microwave power in the modulator 12 which is fed to the amplifier 13.

The amplifier 13 to which the output from the detector 11 is fed is a continuously tunable audio amplifier of known type. The amplifier 13 is tunable to various audio frequency intervals $B_a$ over an audio frequency range which includes all the audio frequencies $f_a$ at which the microwave power is modulated by the Doppler components. Each audio frequency interval $B_a$ is defined between a lower frequency $f_{a1}$ and an upper frequency $f_{a2}$ and each audio frequency interval $B_a$ has a center frequency $F_a$ midway between the lower frequency $f_{a1}$ and the upper frequency $f_{a2}$.

It will be understood that the amplifier 13 amplifies only those components of the output voltage envelope from the detector 11 having audio frequencies $f_{a1-2}$ at and between the lower frequency $f_{a1}$ and the upper frequency $f_{a2}$ which define the audio frequency interval $B_a$ to which the amplifier 13 is tuned. From Equation 1 it will also be understood that the component of the output voltage envelope at the lower frequency $f_{a1}$ is related to microwave power within the modulator 12 having a particular wavelength $\lambda_{g1}$, the component of the output voltage envelope at the upper frequency $f_{a2}$ is related to microwave power within the modulator 12 having a particular wavelength $\lambda_{g2}$, and those components of the output voltage envelope at frequencies $F_{a1-2}$ between the lower frequency $f_{a1}$ and the upper frequency $f_{a2}$ are related to microwave power within the modulator 12 having wavelengths $\lambda_{g1-2}$ between the wavelength $\lambda_{g1}$ and the wavelength $\lambda_{g2}$.

Thus, the amplifier 13 amplifies only that demodulated output of the modulator 12 which is related to microwave power in the modulator 12 having wavelengths of and between $\lambda_{g1}$ and $\lambda_{g2}$. The result is that the output from the amplifier 13 is directly related to microwave power within the modulator 12 within the frequency interval defined by $\lambda_{g1}$ and $\lambda_{g2}$.

The incoherent power source 10 is any convenient source of power at wavelengths $\lambda_g$ throughout the millimeter and low millimeter region. In the specific embodiment of the invention described herein, the incoherent power source 10 is a noise source of known type which produces power at wavelengths $\lambda_g$ throughout a substantial portion of the millimeter and low millimeter region when heated to a particular temperature. Thus, there is microwave power within the modulator 12 at substantially every wavelength $\lambda_g$ in a substantial portion of the millimeter and low millimeter region and components in the output voltage envelope of the detector 11 at audio frequencies $f_a$ corresponding to each wavelength $\lambda_g$ of microwave power within the modulator 12.

The microwave power of the incoherent power source 10 within any microwave frequency interval $B_m$ including microwave power having wavelengths $\lambda_{g1-2}$ in the modulator 12 at and between $\lambda_{g1}$ and $\lambda_{g2}$ is determined using known techniques. Thus, when the amplifier 13 is tuned to amplify only those audio frequencies $f_{a1-2}$ which correspond to microwave power having wavelengths $\lambda_{g1-2}$ in the modulator 12, the output of the amplifier 13 is related to a known microwave power. It will be understood that the known microwave power to which the output of the amplifier 13 is related is solely dependent upon the frequency interval $B_a$ to which the amplifier 13 is tuned and that by tuning the amplifier 13 to various frequency intervals $B_a$, the output of the amplifier 13 becomes related to the various known microwave powers within the various microwave frequency intervals $B_m$ related to the audio frequency intervals $B_a$.

The output of the amplifier 13 is fed to a meter 28 or other known means for observing or recording the output of the amplifier 13 as it is tuned to various audio frequency intervals $B_a$. A particular deflection of the meter 28 will be representative of a particular microwave power. The particular microwave power which the deflection of the meter 28 represents will be that microwave power of the incoherent power source 10 within the microwave frequency interval $B_m$ corresponding to the audio frequency interval $B_a$ to which the amplifier 13 is tuned.

The amplifier 13 is a linear amplifier and the output of the amplifier 13 and the deflection of the meter 28 when the amplifier 13 is tuned to a particular audio frequency interval $B_a$ is best explained in terms of the relationship between the voltage output of the detector 11 and the microwave power input to the detector 11 from the modulator 12 within the microwave frequency interval $B_m$ corresponding to the audio frequency interval $B_a$. This is because the output of the amplifier 13 is directly related to the amplitude of the output voltage envelope from the detector formed by components having frequencies $f_{a1-2}$ within the audio frequency interval $B_a$ and because at low power levels (square wave region) the voltage output $V_d$ from a detector 11 having a responsivity R is known to be related to microwave power input $P_d$ by the equation:

$$V_d = RP_d \quad (2)$$

It is well known that when the difference between the paths P-1 and P-2 is $\delta$, the microwave power input $P_{d'}$ to the detector 11 at a single microwave wavelength $\lambda_g$ in terms of the power input $P_{s'}$ to the modulator 12 is expressed by the equation:

$$P_{d'} = \frac{P_{s'}}{2}\left[1 + \cos\frac{2\pi\delta}{\lambda_g}\right] \quad (3)$$

The input power $P_{s'}$ to the modulator 12 from the incoherent power source 10 at a particular microwave wavelength $\lambda_g$ is a function of the noise temperature T and the total input power $P_s$ into the modulator 12 from the incoherent power source 10 within a microwave frequency interval $B_m$ having a center frequency F is the sum of the microwave power at each wavelength $\lambda_g$ in the microwave frequency interval $B_m$. Thus, from Equation 3, the input power $P_d$ to the detector 11 from the incoherent power source 10 having microwave power at a plurality of wavelengths $\lambda_g$ in the modulator 12 within a frequency interval $B_m$ resulting from heating the incoherent power source 10 to the noise temperature T is:

$$P_d = \frac{K}{2}\int_{F-B_m/2}^{F+B_m/2} T(f_m)\left[1 + \cos\frac{2\pi\delta}{\lambda_g}\right]df_m \quad (4)$$

In Equation 4, K is the known Boltzmann's constant, $T(f_m)$ is the noise temperature at each frequency $f_m$ of the microwave power corresponding to a wavelength $\lambda_g$ within the frequency interval $B_m$, F is the center frequency of the microwave frequency interval $B_m$ corresponding to the center frequency $F_a$ to which the amplifier 13 is tuned, and $\delta$ is the difference in length between the paths P-1 and P-2.

Each of the wavelengths $\lambda_g$ of the microwave power in the modulator 12 can be expressed in terms of free space wavelength $\lambda$, propagation velocity C, and frequency $f$ as follows:

$$\lambda_g = \left(\frac{\lambda_g}{\lambda}\right) C/f \tag{5}$$

Since the frequency interval $B_m$ is relatively narrow, the noise temperature T and ratio $\lambda_g/\lambda$ in Equation 5 are substantially the same at all microwave frequencies $f_m$ corresponding to the wavelengths $\lambda_g$ in the microwave frequency interval $B_m$. Thus, $T(f_m)$ in Equation 4 becomes a constant temperature T and when the equality expressed by Equation 5 is substituted in Equation 4, Equation 4 becomes:

$$P_d = \frac{kT}{2} \int_{F-B_m/2}^{F+B_m/2} \left[1 + \cos\left\{\frac{2\pi\delta}{C}\left(\frac{\lambda}{\lambda_g}\right)f\right\}\right] df \tag{6}$$

When integrated in known manner and with $\lambda_g/\lambda$ being considered a constant, Equation 6 becomes:

$$P_d = \frac{1}{2}kT\left[B_m + \frac{C}{2\pi\delta}\left(\frac{\lambda_g}{\lambda}\right)\left[\sin\left\{\frac{2\pi\delta}{C}\left(\frac{\lambda}{\lambda_g}\right)\left(F + \frac{B_m}{2}\right) - \sin\frac{2\pi\delta}{C}\left(\frac{\lambda}{\lambda_g}\right)\left(F - \frac{B_m}{2}\right)\right]\right] \tag{7}$$

Use of the identity:

$$\sin(\alpha + \beta) - \sin(\alpha - \beta) = 2\cos\alpha\sin\beta \tag{8}$$

in Equation 7 results in Equation 7 becoming:

$$P_d = \frac{1}{2}kTB_m\left[1 + \frac{\sin\left[\frac{2\pi\delta}{C}\left(\frac{\lambda}{\lambda_g}\right)\frac{B_m}{2}\right]}{\frac{2\pi\delta}{C}\left(\frac{\lambda}{\lambda_g}\right)\frac{B_m}{2}} \cos\left\{\frac{2\pi\delta}{C}\frac{\lambda}{\lambda_g}F\right\}\right] \tag{9}$$

From Equation 9 it will be seen that the input power $P_d$ to the detector 11 within a microwave frequency interval $B_m$ is related to the center frequency F of the microwave frequency interval $B_m$. Since $\lambda/\lambda_g$ is assumed to be constant over the relatively narrow microwave frequency interval $B_m$, Equation 5 is used to obtain the following relationship involving the center frequency F of the microwave frequency interval $B_m$ where $\lambda_{gF}$ is the wavelength in the modulator 12 of the microwave power at the center frequency F:

$$\frac{1}{C}\left(\frac{\lambda}{\lambda_g}\right) = \frac{1}{\lambda_{gF}F} \tag{10}$$

This relationship shown by Equation 10 permits Equation 9 to be rewritten in terms of the center frequency F of the microwave frequency interval $B_m$ and Equation 9 becomes:

$$P_d = \frac{1}{2}kTB_m\left[1 + \frac{\sin\frac{2\pi\delta}{\lambda_{gF}F}\frac{B_m}{2}}{\frac{2\pi\delta}{\lambda_{gF}F}\frac{B_m}{2}} \cos\frac{2\pi\delta}{\lambda_{gF}}\right] \tag{11}$$

It will now be understood from Equation 11 that the power input $P_d$ to the detector 11 varies with the difference $\delta$ between the lengths of the paths P–1 and P–2 and that when the paths P–1 and P–2 are of equal length, the power input $P_d$ to the detector 11 is equal to the total power $kTB_m$ of the incoherent power source 10 having wavelengths $\lambda_{g1-2}$ within the microwave frequency interval $B_m$. The difference $\delta$ in length between the paths P–1 and P–2 is equal to the constant speed $s$ at which the length of the path P–2 varies with respect to the length of the path P–1 times the lapsed time $t$ since the paths P–1 and P–2 were of equal length. Thus, $st$ can be substituted for $\delta$ in Equation 11 and Equation 11 becomes:

$$P_d = \frac{1}{2}kTB_m\left[1 + \frac{\sin\left(\frac{2\pi st}{\lambda_g F}\frac{B_m}{2}\right)}{\left(\frac{2\pi st}{\lambda_g F}\frac{B_m}{2}\right)} \cos\frac{2\pi st}{\lambda_g}\right] \tag{12}$$

The term $2\pi st/\lambda_g$ in Equation 12 is the well known time angle in radians of a sine or cosine wave and $2\pi s/\lambda_g F$ can be expressed as $\omega_a$ and Equation 12 written as:

$$P_d = \frac{1}{2}kTB_m\left[1 + \frac{\sin\left(\frac{\omega_a t}{F}\frac{B}{2}\right)}{\left(\frac{\omega_a t}{F}\frac{B}{2}\right)} \cos\omega_a t\right] \tag{13}$$

The nature of the input power $P_d$ to the detector 11 resulting from the Doppler components is clearly revealed by Equation 13 and it will be understood that the input power $P_d$ to the detector 11 is a constant term and a term which varies with lapsed time $t$ since the paths P–1 and P–2 were of equal length. The detector 11 output is a function of both terms in Equation 13. However, only that term in Equation 13 which varies is amplified by the amplifier 13 and when this term is used in Equation 2, the voltage output $V_d$ of the detector 11 which is amplified by the amplifier 13 will be a voltage envelope defined by the equation:

$$V_d = \frac{1}{2}RkTB\frac{\sin\left[\left(\frac{\omega_a t}{F}\right)\frac{B}{2}\right]}{\left[\left(\frac{\omega_a t}{F}\right)\frac{B}{2}\right]} \cos\omega_a t \tag{14}$$

The responsivity, R, for a given detector 11 is substantially constant and it will be seen from Equation 14 that the voltage output of the detector 11 which is amplified by the amplifier 13 is the voltage envelope of a cosine wave which is slowly modulated by a sine term. The output voltage is at a maximum when the lengths of the paths P–1 and P–2 are equal and time $t$ is equal to zero and a peak of voltage output $V_R$ from the detector 11 will occur each time the paths P–1 and P–2 are substantially equal to each other in length. Since this peak of voltage output $V_R$ occurs when time is zero or relatively small, it follows that for this peak of output voltage $V_R$:

$$\sin\left[\left(\frac{\omega_a t}{F}\right)\left(\frac{B_m}{2}\right)\right] \cong \left[\left(\frac{\omega_a t}{F}\right)\frac{B_m}{2}\right] \tag{15}$$

Using the approximate relationship expressed as (15) above in Equation 14, the peak output voltage $V_R$ of the detector 11 becomes:

$$V_R = R\frac{1}{2}kTB_m \cos\omega_a t \tag{16}$$

Equation 16 reveals that the peak output voltage $V_R$ of the detector 11 is related to the microwave power $kTB_m$ from the incoherent power source 10 in the microwave frequency interval $B_m$. The peak output voltage $V_R$ is formed by voltage components at audio frequencies $f_a$ corresponding to the wavelengths $\lambda_g$ in the microwave frequency interval $B_m$ and is representative of the microwave power at all wavelengths $\lambda_g$ in the microwave frequency interval $B_m$.

It will now be understood that output of the amplifier 13 to the meter 28 is the voltage envelope of a cosine wave having a peak voltage $V_R$ representative of the microwave power from the incoherent power source 10 within a microwave frequency interval $B_m$ corresponding to the audio frequency interval $B_a$ to which the amplifier 13 is tuned. It will also be understood that each time the amplifier 13 is tuned to a particular audio frequency interval $B_a$, a peak of output voltage $V_R$ is obtained and that the peak of output voltage $V_R$ occurs when the lengths of the paths P–1 and P–2 are substantially equal. The microwave power in a microwave frequency interval $B_m$ is that microwave power having wavelengths $\lambda_g$ in the modulator 12 corresponding in accordance with Equation 1 to the audio frequencies $f_a$ in the audio frequency interval $B_a$ to which the amplifier 13 is tuned.

For a given incoherent power source 10, the microwave power of which the peak of output voltage $V_R$ is representative depends upon the width of the microwave frequency interval $B_m$ and the location in the millimeter and low millimeter region of the microwave frequency interval $B_m$ corresponding to the audio frequency interval $B_a$ to which the amplifier 13 is tuned. The width of the microwave frequency interval $B_m$ is easily and conveniently changed by changing the width of the audio frequency interval $B_a$ and the location of the microwave frequency interval $B_m$ in the millimeter and low millimeter region is changed by simply tuning the amplifier 13 to a different center frequency $F_a$.

However, the location in the millimeter and low millimeter region of the microwave power of which the peak of output voltage $V_R$ is representative is also changed by changing the speed $s$ at which the difference in length between the paths P–1 and P–2 is changed. This is because a change in the speed $s$ causes different wavelengths of microwave power to be related to the frequencies $f_a$ in a particular audio frequency interval $B_a$. Thus, when the width of the audio frequency interval $B_a$ remains constant, the microwave power represented by the peak of output voltage $V_R$ is changed either by tuning the amplifier 13 to a different audio frequency interval $B_a$ or by changing the speed $s$ at which the difference $\delta$ between the lengths of the paths P–1 and P–2 is changed.

The system for providing electromagnetic power in a frequency interval disclosed herein is shown in simplified form in FIG. 1 and once the system and method of the invention are understood from the description of a microwave power meter above, it will also be understood that the power meter is readily adaptable to a variety of electromagnetic measurements. These measurements may be in any frequency range and those skilled in the art will recognize that equations similar to those above for the microwave frequency range can be developed for other frequency ranges such as the infra-red and optical frequency ranges. Regardless of frequency range, the invention permits electromagnetic measurements over a substantial portion of a frequency range by simply tuning the amplifier 13. Moreover, if the amplifier 13 is not tuned, a stable and convenient indication of known electromagnetic power within a particular known frequency interval is provided. Thus, the invention is useful in all frequency ranges regardless of whether the amplifier 13 is continuously tunable or has a fixed frequency.

*Operation*

Figure 2:
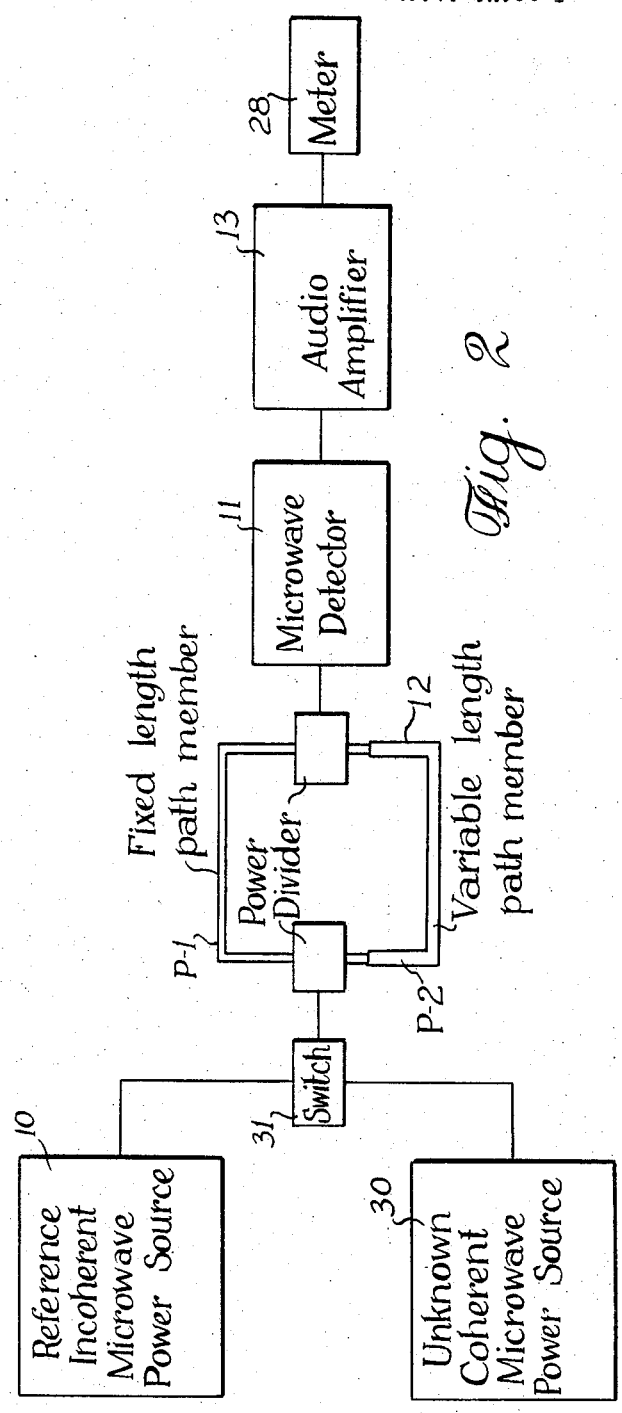
FIG. 2 is a detailed block diagram of a power meter embodying the system and method disclosed herein.
Figure 3:
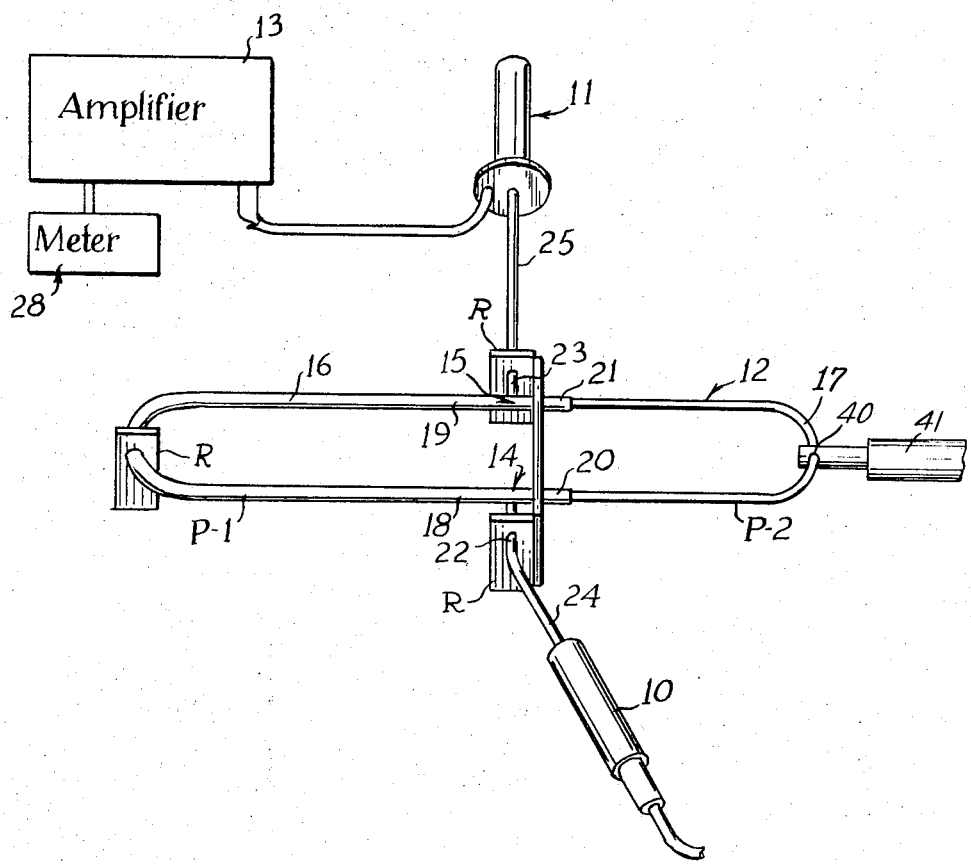
FIG. 3 is a perspective view of the power meter of FIG. 2.

FIGURE 2 shows the invention embodied in a power meter for measuring the power output of an unknown coherent microwave power source 30. When the invention is used for this purpose, it is convenient to feed the microwave power from the coherent power source 30 and the incoherent power source 10 to the modulator 12 through a switch 31 of known type. The switch 31 permits the microwave power from either the coherent power source 30 or from the incoherent power source 10 to be selectively fed to the modulator 12.

When the switch 31 feeds microwave power from the incoherent power source 10 to the modulator 12, a peak of output voltage $V_R$ causes a deflection of the meter 28 representative of a particular known microwave power within a microwave frequency interval $B_m$. When the position of the switch 31 is changed, microwave power from the coherent power source 30 is fed to the modulator 12. Since the power from the coherent power source 30 has a single or only a few wavelengths $\lambda_{gc}$, the resulting power input $P_{dc}$ to the detector 11 is given by an equation such as Equation 3 which when written for a single wavelength $\lambda_{gc}$ using the relationship $\delta = st$ and $$\frac{2\pi s}{\lambda_{gc}} = \omega_a$$

in the same manner as used above becomes:

$$P_{dc} = \frac{P_s}{2}[1 + \cos \omega_a t] \qquad (17)$$

The output voltage of the detector 11 is responsive only to the varying term in Equation 17 and when this term is used in an equation such as Equation 2, the output voltage $V_{dc}$ of the detector 11 resulting from each wavelength $\lambda_{gc}$ of the coherent power source 30 is:

$$V_{dc} = \frac{P_s}{2} \cos \omega_a t \qquad (18)$$

It is this output voltage $V_{dc}$ from the detector 11 which is amplified by the amplifier 13 and it will be understood that if the audio frequency $f_a$ related to the wavelength $\gamma_{gc}$ is within the audio frequency interval $B_a$ to which the amplifier 13 is tuned, there is an output voltage with a peak when the paths P–1 and P–2 are equal in length and time $t$ is zero. This output voltage is fed to the meter 28 and will be representative of the microwave power of the coherent power source 30 at a wavelength $\gamma_{gc}$ in the microwave frequency interval $B_m$ which corresponds to the audio frequency interval $B_a$. It will also be understood that if there is no microwave power from the coherent power source 30 at a wavelength or wavelengths $\gamma_{gc}$ within the microwave frequency interval $B_m$ corresponding to audio frequency interval $B_a$ to which the amplifier is tuned, there will be no output from the amplifier 13.

Thus, when the switch 31 is positioned to feed the microwave power of the coherent power source 30 to the modulator 12, a voltage output representative of the microwave power of the coherent power source 30 at wavelength $\gamma_{gc}$ in the microwave frequency interval $B_m$ corresponding to the audio frequency interval $B_a$ is obtained. The resulting deflection of the meter 28 is compared with the deflection of the meter 28 resulting from the incoherent power source 10 and since the microwave power of the incoherent power source 10 in the microwave frequency interval $B_m$, the microwave power of the coherent power source 30 can be determined by comparing the two deflections of the meter 28.

Once the microwave power of the coherent power source 30 within a particular microwave frequency interval $B_m$ is determined as described, the amplifier 13 is tuned to a second audio frequency interval $B_a$ and the deflections of the meter 28 again compared. The absence of a deflection of the meter 28 when the microwave power from the coherent power source 30 is fed to the modulator 12 by switch 31 indicates that there is no microwave power from the incoherent power source 30 at wavelengths $\gamma_{gc}$ within the microwave frequency interval $B_m$ corresponding to the audio frequency interval $B_a$ to which the amplifier 13 is tuned.

Thus, the microwave power of a coherent power source 30 is easily determined by tuning the amplifier 30 to various audio frequency intervals $B_a$. The sensitivity of the detector 11 or of an unknown detector (not shown) is determined by varying the power of the incoherent power source 10 to determine the minimum power causing a meter 28 deflection as the amplifier 13 is tuned to various audio frequency intervals $B_a$. Similarly, the insertion loss caused by a component (not shown) is easily determined by placing the component (not shown) between the incoherent power source 10 and the modulator 12 and comparing the deflection of the meter 28 when the microwave power passes through the component (not shown) with the deflection of the meter 28 when the microwave power does not pass through the component (not shown) as the amplifier 13 is tuned to various audio frequency intervals $B_a$.

From these examples of the operation of the power meter shown in FIG. 2, it will be apparent that the invention disclosed herein permits a variety of measurements of power output, detector component sensitivity, or power loss to be made. Regardless of the type of power measurment, the frequency intervals $B_m$ at which measurements are made are determined by the tuning of the amplifier 13 and are changed by simply tuning the amplifier 13 to a different frequency interval $B_a$ width or center frequency or by changing the speed $s$ at which the difference $\delta$ between the lengths of the paths P–1 and P–2 changes.

It will be obvious to those skilled in the art that many variations may be made in the embodiments chosen for the purpose of illustrating the present invention without departing from the scope thereof as defined by the appended claims.

What is claimed as invention is:

1. In a power meter, first means for dividing an electro-magnetic power input at a first junction between a first path and a second path from said first junction to a second junction, second means for reciprocatingly varying the mechanical length of said first path relative to the length of said second path at a substantially constant rate so as to modulate an electro-magnetic power input at said first junction at a plurality of Doppler frequencies with the electro-magnetic power at each Doppler frequency being related in frequency and amplitude to electro-magnetic power in said electro-magnetic power input at a particular frequency, third means responsive to said plurality of Doppler frequencies at said second junction for demodulating said electro-magnetic power input and providing an output voltage envelope defined by a plurality of voltage components each having a frequency of one of said plurality of Doppler frequencies and an amplitude proportional to electro-magnetic power at said one of said plurality of Doppler frequencies, fourth means selectively responsive to said plurality of voltage components for providing a signal output having an amplitude proportional to amplitudes of selected ones of said plurality of voltage components, fifth means responsive to said signal output for indicating said amplitude of said signal output, sixth means including an incoherent power source for providing a known electro-magnetic power output at each of a plurality of frequencies within a range of frequencies, and seventh means for selectively providing said known electro-magnetic power output at said first junction as said electro-magnetic power input.

2. The power meter of claim 1 in which said seventh means provides said known electro-magnetic power output at said first junction alternately with an unknown electro-magnetic power output.

3. The power meter of claim 1 in which said substantially constant rate of varying the mechanical length of said first path relative to the length of said second path is one of a plurality of predetermined substantially constant rates.

4. The power meter of claim 1 in which said first means is a wave guide trombone having a stationary loop member and a movable loop member between an input T member at said first junction and an output T member at said second junction.

5. The power meter of claim 1 in which said mechanical length of said first path varies between a first length which is greater than and a second length which is less than said length of said second path.

6. The power meter of claim 5 in which the difference between said first length and said length of said second path is substantially equal to the difference between said second length and said length of said second path.

7. The power meter of claim 1 in which said incoherent power source has a power output with electro-magnetic power in the millimeter and low millimeter range of electro-magnetic power.

8. The power meter of claim 1 in which said amplitude of said signal output is the peak of a cosine wave.

9. The power meter of claim 1 in which said Doppler frequencies are in the audio-frequency range.

10. The power meter of claim 1 in which said third means is an audio-frequency detector.

11. The power meter of claim 10 in which said fourth means is a continuously tunable audio-frequency amplifier.

References Cited

UNITED STATES PATENTS

| | | | |
|---|---|---|---|
| 2,462,841 | 3/1949 | Bruck | 324—58.5 X |
| 2,923,882 | 2/1960 | Bradford | 324—58.5 X |
| 2,951,996 | 9/1960 | Pan | 333—9 |

RUDOLPH V. ROLINEC, *Primary Examiner.*

J. MULROONEY, E. F. KARLSEN,
*Assistant Examiners.*